Patented June 9, 1942

2,285,536

UNITED STATES PATENT OFFICE 2,285,536

MIXED CELLULOSE ESTERS

George W. Seymour and Blanche B. White, Cumberland, Md., assignors to Celanese Corporation of America, a corporation of Delaware No Drawing. Application October 14, 1940, Serial No. 361,104

11 Claims. (Cl. 260—225)

The present invention relates to the production of cellulose derivatives, and relates more particularly to the production of carboxylates of cellulose esters.

It is an object of this invention to provide an improved process for the production of cellulose ester carboxylates.

Another object of this invention is the provision of a process for the production of cellulose ester carboxylates in a simple and expeditious manner by first forming the cellulose ester from cellulose, ripening the cellulose ester and then reacting in the ripening bath the ripened cellulose ester with a carboxylic acid anhydride.

A further object of this invention is the provision of a process for the production of a cellulose ester carboxylate whereby there are obtained products possessing valuable properties.

Other objects of this invention will appear from the following detailed description.

While the process of this invention is applicable to the production of cellulose ester carboxylates by reacting a cellulose ester such as cellulose acetate, cellulose propionate or cellulose butyrate with the anhydride of any carboxylic acid such as, for example, phthalic, succinic, maleic and benzoic anhydrides, for the sake of brevity it will be described in connection with the production of cellulose acetate phthalate which at the present time is commercially the most important of the cellulose ester carboxylates.

The cellulose acetate employed in the process of the present invention may be prepared by any conventional method. However, the method of preparing cellulose acetate hereinafter described is preferably employed as a more rapid production of cellulose acetate from cellulose is effected. Moreover, the cellulose acetate phthalates prepared from the conventional 54-55.5 acetyl value cellulose acetates are extremely low in viscosity and are soluble only in water-rich solvents, such as a solvent medium containing 20% of water and 80% of acetone. In order to prepare cellulose phthalates of more conventional characteristics and solubilities, it has been found desirable to start phthalation by introducing the phthalic anhydride and an excess of neutralizing agent over the sulphuric acid after the cellulose acetate has ripened only so far as it is free from combined sulphates, that is, at the time when the acetyl value of the cellulose acetate is about 60. In this manner not only the solubility and viscosity characteristics of the cellulose acetate phthalates may be controlled but also a more stable product will probably be obtained.

According to the present invention, then, the cellulose acetate is first formed by treating cellulose, with or without a pretreatment with organic acids or organic acids containing a little sulphuric acid, with an acetylating mixture comprising acetic anhydride, acetic acid, and sulphuric acid as catalyst in a proportion of 8 to 15% on the weight of the cellulose. The temperature during the acetylation is preferably maintained at a fairly low figure, and for this purpose the acetic anhydride and acetic acid may be pre-cooled before the introduction of the cellulose in the acetylation mixture. However, peak temperatures of 35° C. or even as high as 40 to 45° C. may be used in the process of the present invention, since by combining such an acetylation process with a special ripening treatment good viscosities are still obtainable.

After the acetylation is complete, the sulphuric acid content of the acetylation medium is adjusted by adding thereto, either before or after the water or together with the water for ripening, a proportion of neutralizing agent such as magnesium acetate, magnesium carbonate or the like so that the sulphuric acid content is about 4 to 8 or 9%, and preferably 4.5 to 5%, of free sulphuric acid based on the weight of the cellulose used as the starting material. A suitable amount of water is then added to the acetylation mixture and the mixture is then ripened at 50 to 60° C. for from 3 to 7 hours or until a cellulose acetate of the desired acetyl value is obtained. Generally, the amount of water used for ripening is from 20 to 40% based on the original weight of the cellulose and excluding the amount of water necessarily added for the purpose of destroying the acid anhydride left over at the end of the acetylation. It has been found that an amount of water equal to 37.5% on the weight of the original cellulose gives particularly good results with respect to viscosity and other properties of the final product. This water may, where suitable, be added as such or may be added in the form of a direct solution of acetic acid, it being merely necessary to have it stirred in without producing any substantial precipitation of the cellulose acetate at the beginning of the ripening treatment. The magnesium acetate, magnesium carbonate or the like may be added together with the water for ripening, particularly if this is added in the form of a dilute solution of acetic acid, or it may be added separately, e. g., in solution in glacial acetic acid. Other neutralizing agents may be used, though it is found that magnesium salts are best. Other neutralizing agents include calcium acetate, calcium carbonate, sodium acetate, sodium carbonate, zinc acetate and zinc oxide.

After the ripening had proceeded to the point where the cellulose acetate approached the desired acetyl value, for example, an acetyl value of 55.5, calculated as acetic acid, sufficient neutralizing agent is added to the ripening solution to neutralize completely all of the sulphuric acid present, or an excess of this quantity. The neutralizing agent is stirred in thoroughly and then the phthalic anhydride is added and the mixture stirred at 60° C. for an additional 2 to 6 hours.

By the process of this invention any amount of phthalic acid can be introduced into the cellulose acetate, for example, from traces where short ripening temperatures and low phthalic anhydride are employed to as high as 27% and, in fact, complete phthalation and complete deacetylation may be attained.

In order further to illustrate our invention, but without being limited thereto, the following specific examples are given:

Example I 170 parts of cotton are acetylated with 630 parts acetic acid, 350 parts of acetic anhydride and 25 parts of sulphuric acid, the parts being by weight, the time of acetylation is 1½ hours during which a peak temperature of 42° C. is allowed to occur. Water is then added in amounts only sufficient to react with any acetic anhydride present. The ripening is effected by adding to the primary solution an amount of magnesium carbonate (about 16 parts by weight) to react with and neutralize 68.2% of the sulphuric acid present, together with 62 parts of water. The mass is then agitated in a jacketed Werner-Pfleiderer machine, where its temperature is maintained at 60° C., for 7 hours.

16 parts by weight of magnesium carbonate are then stirred into the ripening solution which amount is 4.9 parts in excess of the amount required to neutralize all of the sulphuric acid remaining in the ripening solution and 97 parts by weight of phthalic anhydride are added and the mixture stirred at 60° C. for an additional 2 hours. The cellulose acetate phthalate is precipitated by the addition of a large amount of water and is then washed and dried. The cellulose acetate phthalate has an acetyl value of 54.7, calculated as acetic acid, and a phthalyl value of 0.75 calculated as phthalic acid.

The cellulose acetate phthalate produced in accordance with this process is quite stable and does not require a further treatment, say with dilute sulphuric acid, for stabilizing the same. It has a heat test of 233 to 235° C. Filaments, yarns or fabrics made from the cellulose acetate phthalate produced in accordance with this invention show increased resistance of dyestuffs to acid fading and greater substantivity to dyestuffs.

Example II 170 parts of cotton are acetylated with 630 parts acetic acid, 350 parts of acetic anhydride and 25 parts of sulphuric acid, the parts being by weight, the time of acetylation is 1½ hours during which a peak temperature of 42° C. is allowed to occur. Water is then added in amounts only sufficient to react with any acetic anhydride present. The ripening is effected by adding to the primary solution an amount of magnesium carbonate (about 16 parts by weight) to react with and neutralize 68.2% of the sulphuric acid present, together with 62 parts of water. The mass is then agitated in a jacketed Werner-Pfleiderer machine, where its temperature is maintained at 60° C. for 7 hours.

40 parts by weight of magnesium carbonate are then stirred into the ripening solution which amount is 30 parts in excess of the amount required to neutralize all of the sulphuric acid remaining in the ripening solution and 195 parts by weight of phthalic anhydride are added and the mixture stirred at 60° C. for an additional 4 hours. The cellulose acetate phthalate is precipitated by the addition of a large amount of water and is then washed and dried. The cellulose acetate phthalate has an acetyl value of 53.7, calculated as acetic acid, and a phthalyl value of 2.3, calculated as phthalic acid.

The cellulose acetate phthalate produced in accordance with this process is quite stable and does not require a further treatment, say with dilute sulphuric acid, for stabilizing the same. It has a heat test of 236 to 238° C. Filaments, yarns or fabrics made from the cellulose acetate phthalate produced in accordance with this invention show increased resistance of dyestuffs to acid fading and greater substantivity to dyestuffs.

Example III 170 parts of cotton are acetylated with 630 parts of acetic acid, 350 parts of acetic anhydride and 25 parts of sulphuric acid, parts being by weight. The time of acetylation is 1½ hours during which a peak temperature of 42° C. is allowed to occur. Water is added in amounts only sufficient to react with any acetic anhydride present. The ripening is effected by adding to the primary solution an amount of magnesium carbonate (about 16 parts by weight) to react with and neutralize approximately 70% of the sulphuric acid present, together with 62 parts of water. The mass is agitated at 60° C. for 7 hours.

62 parts by weight of magnesium carbonate are then stirred into the ripening solution to neutralize all the sulphuric acid and leave an excess of approximately 50% of magnesium carbonate in the ripening solution. 389 parts by weight of phthalic anhydride are added and the mixture stirred at 60° C. for an additional 4 hours. The ester is precipitated by the addition of a large amount of water and is then washed and dried.

The cellulose acetate phthalate produced has a total ester value of 55.3 calculated as acetic acid, included in which is a phthalyl value of 6.25% calculated as pthalic acid. The cellulose acetate phthalate produced is reasonably stable and does not necessarily require further treatment with the dilute sulphuric acid, for example, for stabilizing the same. It has a heat test of 234–236° C.

This cellulose acetate phthalate when dissolved in acetone, spun into yarn and dyed with SRA Blue IV is completely resistant to acid fading after 40 hours exposure in an acid fading cabinet. Yarns and fabrics made from these cellulose acetate phthalates also have increased affinity for some of the more difficultly-dyed dyestuffs which normally require excessively high temperature dyeing conditions.

It is to be understood that the foregoing detailed description is given merely by way of illustration and that many variations may be made therein without departing from the spirit of our invention.

Having described our invention, what we desire to secure by Letters Patent is:

1. A method for the production of carboxylates of cellulose esters, which comprises esterifying cellulose with an anhydride of a lower aliphatic acid in a solvent for the cellulose ester produced using sulphuric acid as catalyst, ripening the cellulose ester, neutralizing the sulphuric acid present in the ripening solution with an excess of weak neutralizing agent, and treating said ripened cellulose ester with an anhydride of an organic carboxylic acid in the ripening solution.

2. A method for the production of carboxylates of cellulose acetate, which comprises acetylating cellulose with acetic anhydride in acetic acid as solvent for the cellulose acetate using sulphuric acid as catalyst, ripening the cellulose acetate, neutralizing the sulphuric acid present in the ripening solution with an excess of weak neutralizing agent, and treating said ripened cellulose acetate with an anhydride of an organic carboxylic acid in the ripening solution.

3. A method for the production of cellulose acetate phthalate, which comprises acetylating cellulose with acetic anhydride in acetic acid as solvent for the cellulose acetate using sulphuric acid as catalyst, ripening the cellulose acetate, neutralizing the sulphuric acid present in the ripening solution with an excess of weak neutralizing agent, and treating said ripened cellulose acetate with phthalic acid anhydride in the ripening solution.

4. A method for the production of carboxylates of cellulose esters, which comprises esterifying cellulose with an anhydride of a lower aliphatic acid in a solvent for the cellulose ester produced using sulphuric acid as catalyst, adjusting the sulphuric acid present in the primary esterification solution to a concentration of 4 to 9%, based on the weight of the cellulose originally present, ripening the cellulose ester, neutralizing the sulphuric acid present in the ripening solution with an excess of weak neutralizing agent and treating said ripened cellulose ester with an anhydride of an organic carboxylic acid in the ripening solution.

5. A method for the production of carboxylates of cellulose acetate, which comprises acetylating cellulose with acetic anhydride in acetic acid as solvent for the cellulose acetate using sulphuric acid as catalyst, adjusting the sulphuric acid present in the primary acetylation solution to a concentration of 4 to 9%, based on the weight of the cellulose originally present, ripening the cellulose acetate, neutralizing the sulphuric acid present in the ripening solution with an excess of weak neutralizing agent and treating said ripened cellulose acetate with an anhydride of an organic carboxylic acid in the ripening solution.

6. A method for the production of cellulose acetate phthalate, which comprises acetylating cellulose with acetic anhydride in acetic acid as solvent for the cellulose acetate using sulphuric acid as catalyst, adjusting the sulphuric acid present in the primary acetylation solution to a concentration of 4 to 9%, based on the weight of the cellulose originally present, ripening the cellulose acetate, neutralizing the sulphuric acid present in the ripening solution with an excess of weak neutralizing agent and treating said ripened cellulose acetate with phthalic acid anhydride in the ripening solution.

7. A method for the production of carboxylates of cellulose esters, which comprises esterifying cellulose with an anhydride of a lower aliphatic acid in a solvent for the cellulose ester produced using sulphuric acid as catalyst, adjusting the sulphuric acid present in the primary esterification solution to a concentration of 4 to 9%, based on the weight of the cellulose originally present, ripening the cellulose ester at a temperature of 50 to 60° C., adding magnesium corbonate to the ripening solution in amount in excess of that required to neutralize the sulphuric acid present therein and treating said ripened cellulose ester with an anhydride of an organic carboxylic acid in the ripening solution at a temperature of 60° C.

8. A method for the production of carboxylates of cellulose acetate, which comprises acetylating cellulose with acetic anhydride in acetic acid as solvent for the cellulose acetate using sulphuric acid as catalyst, adjusting the sulphuric acid present in the primary acetylation solution to a concentration of 4 to 9%, based on the weight of the cellulose originally present, ripening the cellulose acetate at a temperature of 50 to 60° C., adding magnesium carbonate to the ripening solution in amount in excess of that required to neutralize the sulphuric acid present therein and treating said ripened cellulose acetate with an anhydride of an organic carboxylic acid in the ripening solution at a temperature of 60°C.

9. A method for the production of cellulose acetate phthalate, which comprises acetylating cellulose with acetic anhydride in acetic acid as solvent for the cellulose acetate using sulphuric acid as catalyst, adjusting the sulphuric acid present in the primary acetylation solution to a concentration of 4 to 9%, based on the weight of the cellulose originally present, ripening the cellulose acetate at a temperature of 50 to 60° C., adding magnesium carbonate to the ripening solution in amount in excess of that required to neutralize the sulphuric acid present therein and treating said ripened cellulose acetate with phthalic acid anhydride in the ripening solution at a temperature of 60° C.

10. A method for the production of carboxylates of cellulose acetate, which comprises acetylating cellulose with acetic anhydride in acetic acid as solvent for the cellulose acetate using sulphuric acid as catalyst, adjusting the sulphuric acid present in the primary acetylation solution to a concentration of 4 to 9%, based on the weight of the cellulose originally present, ripening the cellulose acetate at a temperature of 50 to 60° C., adding magnesium carbonate to the ripening solution in amount in excess of that required to neutralize the sulphuric acid present therein and treating said ripened cellulose acetate with an anhydride of an organic carboxylic acid in the ripening solution at a temperature of 60° C. for 2 to 4 hours.

11. A method for the production of cellulose acetate phthalate, which comprises acetylating cellulose with acetic anhydride in acetic acid as solvent for the cellulose acetate using sulphuric acid as catalyst, adjusting the sulphuric acid present in the primary acetylation solution to a concentration of 4 to 9%, based on the weight of the cellulose originally present, ripening the cellulose acetate at a temperature of 50 to 60° C., adding magnesium carbonate to the ripening solution in amount in excess of that required to neutralize the sulphuric acid present therein and treating said ripened cellulose acetate with phthalic acid anhydride in the ripening solution at a temperature of 60° C. for 2 to 4 hours.

GEORGE W. SEYMOUR.
BLANCHE B. WHITE.